US00RE37613E

(19) United States
(12) Reissued Patent
Savage

(10) Patent Number: US RE37,613 E
(45) Date of Reissued Patent: Mar. 26, 2002

(54) SYSTEM FOR SPECIFYING ADDRESSES BY CREATING A MULTI-BIT RANKED ORDERED ANCHOR PATTERN AND CREATING NEXT ADDRESS BY SHIFTING IN THE DIRECTION OF THE SUPERIOR POSITION

(75) Inventor: Thomas Warren Savage, San Jose, CA (US)

(73) Assignee: Compaq Cupertino Corporation, Cupertino, CA (US)

(21) Appl. No.: 09/272,936

(22) Filed: Mar. 18, 1999

Related U.S. Patent Documents

Reissue of:
(64) Patent No.: 5,613,158
Issued: Mar. 18, 1997
Appl. No.: 08/248,807
Filed: May 25, 1994

(51) Int. Cl.[7] ..... G06F 13/10
(52) U.S. Cl. ..... 710/9; 710/104; 711/5; 711/202; 340/3.21; 340/3.51
(58) Field of Search ..... 711/5, 202; 710/9, 710/104, 101, 111, 113, 8; 340/825.07, 3.21, 3.51; 364/955, 960, 240.5, 905

(56) References Cited

U.S. PATENT DOCUMENTS 3,993,980 A * 11/1976 Moreton ..... 710/8
4,016,369 A * 4/1977 Pedersen ..... 370/449
4,050,098 A * 9/1977 Seipp ..... 712/38
4,161,634 A * 7/1979 Bellisio ..... 340/825.07
4,253,087 A * 2/1981 Saal ..... 340/825.52
4,373,181 A * 2/1983 Chisholm et al. ..... 711/211
4,626,846 A * 12/1986 Parker et al. ..... 340/825.52
4,727,475 A * 2/1988 Kiremidjian ..... 710/104
4,873,671 A * 10/1989 Kowshik et al. ..... 365/189.12
4,963,862 A * 10/1990 Nakabayashi et al. . 340/825.52
4,969,126 A * 11/1990 Maeno ..... 365/240
5,065,154 A * 11/1991 Kaiser et al. ..... 340/825.52
5,157,658 A * 10/1992 Arai et al. ..... 370/254
5,386,515 A * 1/1995 Martin et al. ..... 710/5
5,437,019 A * 7/1995 Brockmann ..... 711/5
5,522,077 A * 5/1996 Cuthbert et al. ..... 709/303

FOREIGN PATENT DOCUMENTS

EP 0491480 A2 * 6/1992

OTHER PUBLICATIONS

Article by D. Meltzer, entitled "Selective Addressing of Devices Using Primitive Polynomial Transformations" published by IBM Technical Disclosure Bulletin vol. 22, No. 3, Aug. 1979, pp. 1124–1127.*

* cited by examiner

*Primary Examiner*—Thomas C. Lee
*Assistant Examiner*—Tanh Nguyen
(74) *Attorney, Agent, or Firm*—Fenwick & West LLP

(57) ABSTRACT

An automatic addressing technique for flexibility specifying the individual physical addresses of a plurality of devices coupled to an information bus. An anchor pattern is applied to an address bus of a plurality of address taps sufficient to uniquely specify the numbered J of devices to be attached thereto. Each device is connected to a tap on the address bus, each tap having the same number of bits. A plurality of address transform elements are serially connected to the bus, each transform element being located between adjacent tap positions. Each transform element converts the address pattern coupled to its input to another pattern capable of uniquely specifying the next address in the desired sequence. A wide variety of address sequences are available for selection, with each particular address sequence automatically determined by the related specific anchor pattern. The transform elements are passive elements, and no jumpers or settable switches are required to specify the physical addresses when configuring or reconfiguring the system.

24 Claims, 4 Drawing Sheets

| BUS 25 CONDUCTOR | BUS 25 TAP LOCATION | FIELD 2 | | | | | | | | FIELD 1 | | | | FIELD 0 | | | |
|---|---|---|---|---|---|---|---|---|---|---|---|---|---|---|---|---|---|
| | | 3 | 2 | 1 | 0 | 9 | 8 | 7 | 6 | 5 | 4 | 3 | 2 | 1 | 0 |
| | 0 | 0 | 0 | 0 | 0 | 0 | 1 | 1 | 1 | 0 | 0 | 1 | 1 | 0 | 1 |
| | 1 | 1 | 0 | 0 | 0 | 0 | 1 | 1 | 1 | 1 | 0 | 0 | 1 | 1 | 0 |
| | 2 | 1 | 1 | 0 | 0 | 0 | 0 | 1 | 1 | 1 | 1 | 0 | 0 | 0 | 1 |
| | 3 | 1 | 1 | 1 | 0 | 0 | 0 | 0 | 1 | 0 | 1 | 1 | 0 | 1 | 0 |
| | 4 | 1 | 1 | 1 | 1 | 0 | 0 | 0 | 0 | 0 | 0 | 1 | 1 | 0 | 1 |
| | 5 | 0 | 1 | 1 | 1 | 1 | 0 | 0 | 0 | 1 | 0 | 0 | 1 | 1 | 0 |
| | 6 | 0 | 0 | 1 | 1 | 1 | 1 | 0 | 0 | 1 | 1 | 0 | 0 | 0 | 1 |
| | 7 | 0 | 0 | 0 | 1 | 1 | 1 | 1 | 0 | 0 | 1 | 1 | 0 | 1 | 0 |

FIG. 3

| | | | | | | | | | | | | | | | |
|---|---|---|---|---|---|---|---|---|---|---|---|---|---|---|---|
| 0 | 1 | 0 | 1 | 1 | 0 | 0 | 0 | 1 | 0 | 1 | 1 | 1 | 1 | 0 | 0 |
| 1 | 1 | 1 | 0 | 1 | 1 | 0 | 1 | 0 | 0 | 0 | 0 | 1 | 0 | 1 | 1 |
| 2 | 0 | 1 | 1 | 0 | 1 | 0 | 0 | 0 | 1 | 1 | 0 | 0 | 1 | 1 | 0 |
| 3 | 0 | 0 | 1 | 1 | 0 | 1 | 1 | 0 | 0 | 1 | 1 | 0 | 1 | 1 | 0 |
| 4 | 0 | 0 | 0 | 1 | 1 | 0 | 0 | 1 | 1 | 0 | 1 | 1 | 0 | 1 | 1 |
| 5 | 1 | 0 | 0 | 0 | 1 | 1 | 0 | 0 | 1 | 0 | 1 | 0 | 0 | 1 | 0 |
| 6 | 1 | 1 | 0 | 0 | 0 | 0 | 1 | 1 | 0 | 0 | 0 | 1 | 1 | 0 | 1 |
| 7 | 0 | 1 | 1 | 0 | 1 | 0 | 0 | 1 | 1 | 1 | 1 | 0 | 0 | 1 | 0 |

FIG. 4

| T | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| 0 | 0 | 1 | 1 | 0 | 0 | 1 | 1 | 0 | 0 | 1 | 0 | 1 | 0 | 1 | 0 | 1 | 1 | 1 | 1 | 1 | 0 | 0 | 0 | 0 |
| 1 | 0 | 0 | 1 | 1 | 0 | 0 | 1 | 1 | 1 | 0 | 1 | 0 | 1 | 0 | 1 | 0 | 0 | 1 | 1 | 1 | 1 | 0 | 0 | 0 |
| 2 | 1 | 0 | 0 | 1 | 1 | 0 | 0 | 1 | 0 | 1 | 0 | 1 | 0 | 1 | 0 | 1 | 0 | 0 | 1 | 1 | 1 | 1 | 0 | 0 |
| 3 | 1 | 1 | 0 | 0 | 1 | 1 | 0 | 0 | 1 | 0 | 1 | 0 | 1 | 0 | 1 | 0 | 0 | 0 | 0 | 1 | 1 | 1 | 1 | 0 |
| 4 | 0 | 1 | 1 | 0 | 0 | 1 | 1 | 0 | 0 | 1 | 0 | 1 | 0 | 1 | 0 | 1 | 0 | 0 | 0 | 0 | 1 | 1 | 1 | 1 |
| 5 | 0 | 0 | 1 | 1 | 0 | 0 | 1 | 1 | 1 | 0 | 1 | 0 | 1 | 0 | 1 | 0 | 1 | 0 | 0 | 0 | 0 | 1 | 1 | 1 |
| 6 | 1 | 0 | 0 | 1 | 1 | 0 | 0 | 1 | 0 | 1 | 0 | 1 | 0 | 1 | 0 | 1 | 1 | 1 | 0 | 0 | 0 | 0 | 1 | 1 |
| 7 | 1 | 1 | 0 | 0 | 1 | 1 | 0 | 0 | 1 | 0 | 1 | 0 | 1 | 0 | 1 | 0 | 1 | 1 | 1 | 0 | 0 | 0 | 0 | 1 |

FIG. 5

SYSTEM FOR SPECIFYING ADDRESSES BY CREATING A MULTI-BIT RANKED ORDERED ANCHOR PATTERN AND CREATING NEXT ADDRESS BY SHIFTING IN THE DIRECTION OF THE SUPERIOR POSITION

Matter enclosed in heavy brackets [ ] appears in the original patent but forms no part of this reissue specification; matter printed in italics indicates the additions made by reissue.

BACKGROUND OF THE INVENTION

This invention relates to addressing techniques used for bus oriented computer systems. More particularly, this invention relates to an automatic addressing technique for flexibly specifying the individual addresses of a plurality of devices coupled to an information bus.

Bus oriented computer systems are known in which individual devices connected to an information bus are assigned unique addresses specifying the location of each device in a computer system. Typically, individual devices are provided with a mechanical, electrical or electromechanical device capable of being set to provide a unique address for the device. For example, in some known arrangements, each device is provided with jumper terminals which can be connected to an appropriate voltage (e.g., ground) in such a manner that the voltage level on the combined collection of jumper terminals uniquely specifies the physical address of that device, usually using a binary numbering system. In still other known system, manually actuatable switches are employed for the same purpose. In both types of arrangement, the specification of a unique device address requires that a user, usually a technician, manipulate the address specifying device, which creates the possibility for human error in initially configuring the system. In addition, to reconfigure such a system, for example by adding more bus devices, the user must check the setting of each device (or a master list on which the individual addresses are recorded) in order to ensure that the new addresses to be assigned to the additional devices do not duplicate already used addresses.

Still other systems employ active electronic devices capable of responding to interrogation from a host computer by setting a device address generated by the host computer and transmitted thereto over the information bus. Such arrangements require additional active electronic circuits in the bus devices, and also require special programming capability in the host computer to generate the individual device address values and transmit such values to the individual bus devices. Also required is a routine for establishing that an address transmitted to a device was correctly received and stored by that device. This type of arrangement required a relatively sophisticated programming approach and is prone to both software and signaling errors.

SUMMARY OF THE INVENTION

The invention comprises an automatic addressing technique for specifying the individual unique addresses of an array of devices which is relatively simple and inexpensive to implement, highly reliable in operation, capable of establishing any address sequence required in a given application, and highly compatible with highly configurable computer system.

From a first aspect, the invention comprises a method of specifying the physical address of a plurality of devices each requiring a unique address in an array, the method including the steps of selecting the individual desired address sequence, creating an anchor pattern representing an initial device address, the anchor pattern having a plurality of multi-bit rank ordered fields each having a superior end position and an inferior end position, creating a bit pattern representing the next address in the sequence by shifting the bit pattern in each field in the direction of the superior end position of that field by an integral multiple (preferably unity) of one rank and relocating the superior end rank position bit of the pattern to the inferior end rank position, and continuing the step of creating a bit pattern representing the next address until the last address in the sequence is attained. For an anchor pattern comprising N bits, the number of the fields can range from N to i, where i is the minimum number of bits required to uniquely specify a total number of J devices. Each address is specified with a bit of predetermined rank from each of the i fields.

From an apparatus standpoint, the invention comprises a multiconductor bus device for specifying a unique physical address for each of a plurality of J devices in an array in accordance with a desired address sequence, the bus device comprising N conductors arranged in parallel and grouped into i fields, where i is the minimum number of bits required to uniquely specify J devices, each field having a plurality of rank ordered bits with a superior end position and an inferior end position, the physical address for each device being determined by i bit values selected from one conductor of each field, and a plurality of transform elements each having an input coupled to the N conductors for converting a physical device address presented at the input thereto to the next physical device address at the output thereof, each transform element including means for shifting the bit pattern in each field of a physical device address presented at the input by an integral multiple (preferably unity) of one rank and relocating the superior end rank position bit of the input address to the inferior rank position of the output address. The number of bit values i used to determine the physical address for each device may be increased up to a value of N, if desired, to create additional potential address sequences.

Each transform element preferably comprises a plurality of N input terminals, a plurality of N output terminals and a plurality of N conductive paths coupled between the input terminals and the output terminals, one path coupling the input terminal corresponding to the superior end rank position of each field to the output terminal located at the inferior rank position of the corresponding field.

From a different method aspect, the invention comprises a method of producing a multi-bit anchor pattern capable of transformation into a desired sequence of physical device addresses, each address comprising a plurality of bits each selected from a different one of a plurality of rank ordered multi-bit fields, each bit in each address corresponding to a preselected rank in the associated multi-bit field. The method proceeds by selecting a desired address sequence, converting each address of the desired sequence to a multi-field binary equivalent having a number of fields equal to the number of bits comprising each address, and arranging the bits in each binary equivalent field in a sequential order related to the manner in which the anchor pattern is transformed into the desired sequence of physical device addresses.

The invention provides a highly reliable device addressing capability which is extremely simple to implement, requiring only passive electrically conductive paths arranged in a repeated predetermined pattern in order to effect the sequential address transformations. Since the desired sequence can be unlimited, the invention is extremely useful and effective is bus oriented computer systems which are intended to be highly configurable. Moreover, the specification of a desired address sequence is completely determined once the anchor pattern has been established for a given desired sequence.

For a fuller understanding of the nature and advantages of the invention, reference should be had to the ensuing detailed description taken in conjunction with the accompanying drawings.

BRIEF DESCRIPTION OF THE DRAWINGS

FIG. 3 illustrates the anchor pattern required to effect a first address sequence; and FIGS. 4 and 5 illustrate other anchor patterns required to effect two different address sequences.

DETAILED DESCRIPTION OF THE PREFERRED EMBODIMENTS

Figure 1:
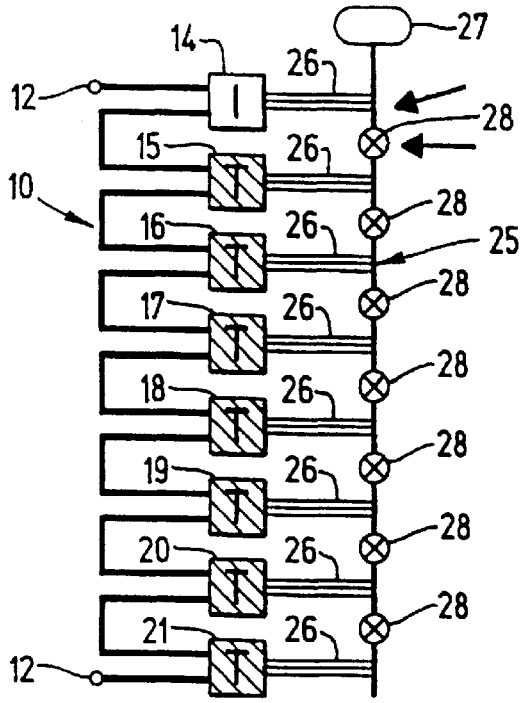
FIG. 1 is a schematic diagram illustrating the preferred embodiment of the invention.

Turning now to the drawings, FIG. 1 is a schematic diagram illustrating the invention as implemented in conjunction with a Small Computer Systems Interface (SCSI) bus system. The SCSI bus standards are defined in ANSI document X3.131, the disclosure of which is hereby incorporated by reference. As seen in this figure, a SCSI bus generally designated with reference numeral 10 has a conventional terminator 12 coupled to each end thereof, and a plurality of computer devices coupled together in a serial or daisy-chain configuration. The first such device is an initiator 14, typically a computer. The remaining seven devices are target devices, usually storage devices (such as disc drives or tape drives) 15–21.

The SCSI bus 10 is supplemented by a multi-bit address bus generally designated with reference numeral 25 which conveys physical device addresses. Bus 25 is coupled to a host device (not illustrated) which generates a multi-bit character termed an anchor pattern, which is applied to one end of bus 25, for example upper end 27 illustrated in FIG. 1. Each bus device 14–21 is coupled to address bus 25, and address bus 25 includes a plurality of anchor pattern transform elements 28 at locations intermediate the connection points of the SCSI bus devices 14–21 to the address bus 25. In the specific embodiment illustrated in FIG. 1 and described below, each SCSI bus device 14–21 is connected to the same three conductors within address bus 25, these connection points being termed the tap points. Since the addressing scheme is a binary based system, three lines, each corresponding to a bit of address information, are the minimum required to uniquely specify eight different devices. Also, for reasons explained more fully below, fourteen conductors are used in address bus 25 to generate any one of a large number of desired sequences of physical device addresses 0–7 in the FIG. 1 system.

Figure 2:
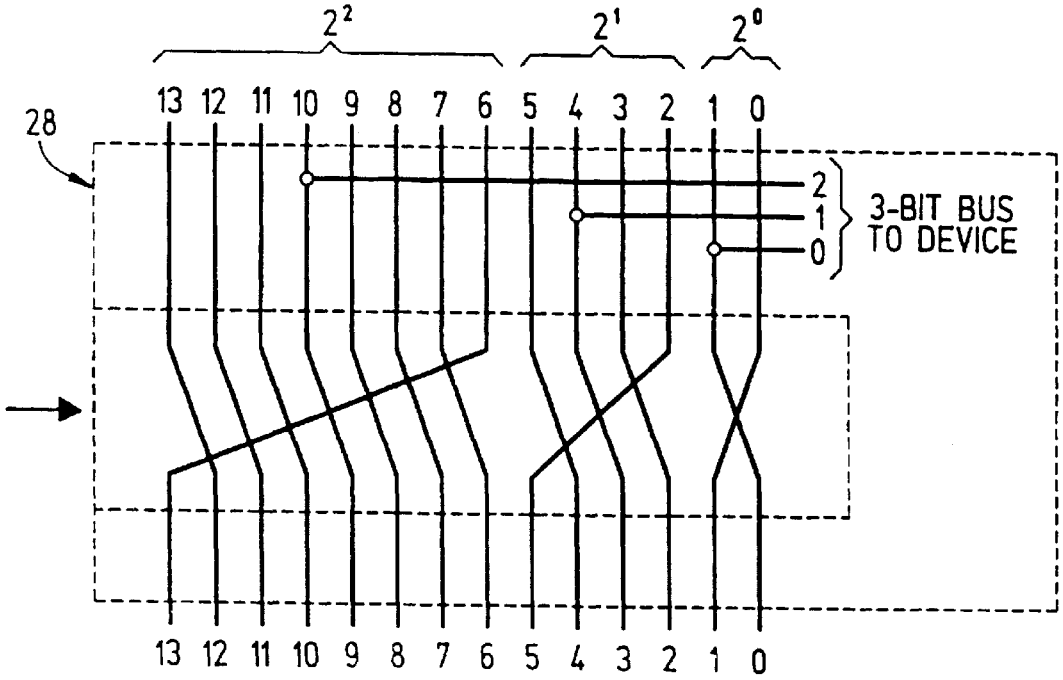
FIG. 2 illustrates the address transform element used in the preferred embodiment.

FIG. 2 illustrates the address transform element 28 used in the embodiment of FIG. 1. In FIG. 2, the fourteen conductors within address bus 25 are ordered 0–13, as indicated, and the three tap connections are taken from conductor Nos. 1, 4 and 10. As will become more evident below, the three bit address is composed of three fields: the first field comprised of conductors 0 and 1, a second field composed of conductors 2–5, and a third field composed of conductors 6–13. As will be appreciated by those skilled in the art, these fields correspond to the $2^0$, $2^1$ and $2^2$ fields, respectively, of a three bit binary number. In each transform element 28, the conductors in each field are connected to effect a one order shifting of each conductor in a fixed direction, field by field, with the last conductor in the direction of the shift being coupled back to the first conductor in the field. This may be most readily understood by referring to the $2^2$ field comprising conductors 6–13. The input side of conductor 13 emerges from transform element 28 as conductor 12, 12 emerges as 11, 11 emerges as 10, etc. Thus, conductors 13–7 are effectively right shifted one rank in this field. Conductor 6, which is the edgemost conductor in the shifted direction (right), emerges as conductor 13 on the output side. Thus, the field composed of conductors 6–13 is shifted right by one rank, with the end conductor in the direction of the shift, hereinafter termed the superior end position, relocated to the opposite end of the rank, termed the inferior end position.

Similarly, in the field composed of conductors 2–5, conductors 3, 4 and 5 are right shifted between the input side and the output side, and the superior end conductor (conductor 2) is relocated to the inferior end position (as emerging conductor 5).

The same transform is effected on the conductors in the fields composed of conductors 0 and 1; however, since there are only two conductors, the shifting and relocation of the superior end conductor to the inferior end position merely requires the transposition of the two conductors 0 and 1.

As noted above, each transform element 28 in the address bus 25 has the identical configuration to that just described with reference to FIG. 2.

An important feature of the invention is the addressing flexibility afforded by the transform elements 28 when combined with the anchor pattern selection described below. In essence, the SCSI bus devices 14–21 can be assigned physical addresses in a wide variety of different sequential address orders by selecting the correct anchor pattern. For example, SCSI bus devices 14–21 may simply be addressed in their order of physical proximity to anchor terminal 27, designating initiator 14 with address 0, target device 15 with address 1, target device 16 with address 2, etc.

FIG. 3 illustrates the anchor pattern required to effect this particular address sequence. In this figure, the bus conductors are numbered in the same order as that described above with reference to FIG. 2 and the three field grouping is indicated by the vertical separation lines. Also, the tap locations 0–7 corresponding to the SCSI bus devices 14–21 are indicated in the leftmost column. The anchor pattern is the pattern to the immediate right of tap location 0 and the transformed patterns at tap locations 1–7 are sequentially presented in rows from top to bottom of the figure. The three tap lines are chosen in this example are conductor Nos. 1 (field 0), 4 (field 1) and 10 (field 2), which is the same tap arrangement as that depicted in FIG. 2. Thus, at tap location 0, the designated three bit address is binary 000, which corresponds to 0 decimal. At tap location 1, the three bit address is 001, which is decimal 1, the three bit address at tap location 2 is binary 010 corresponding to decimal 2, etc. Thus, by applying a 14-bit anchor pattern of 00001111001101, the address sequence 0–7 is obtained automatically by virtue of the transform operation effected on the 14-bit pattern by each transform element 28.

The manner in which the anchor pattern is established is as follows. Initially, the desired decimal address sequence is selected. Next, the address sequence is decomposed into a three-digit binary number comprised of the field components $2^2+2^1+2^0$. For the 14-bit pattern example under discussion, the pattern of each binary field must be checked for compliance with two specific rules. First, the $2_1$ sequence must repeat every four bits. Second, the $2^0$ sequence must alternate every bit. If the sequence does not satisfy both rules, another sequence must be chosen until a sequence is found which does comply.

Once a sequence which satisfies both rules is found, the bit sequence for the $2^2$ field is laid out across bits 6–13 of the anchor pattern (corresponding to bus 25 conductors 6–13) starting at the tap bit and proceeding in the opposite direction of the shift effected by the transform elements 28. Since the transform element 28 produces a right shift, the bit sequence is laid out from right to left, starting at the tap bit, wrapping from bit position 13 to the first bit position in the $2^2$ field (bit 6) and finishing at bit 9. Next, the bit sequence for the $2^1$ field is laid out across bits 2–5 from the anchor pattern, starting at the tap bit in the same manner as in the previous layout for the $2^2$ field. Only four bits are required, since the pattern repeats after four bits (rule 1). Lastly, the two bits of the $2^0$ field are laid out across bits 0 and 1 of the anchor pattern starting at the tap bit in the same manner as in the previous steps. Only two bits are required since the pattern alternates (rule 2). The anchor pattern is now completely determined.

The following is an example of the construction of an anchor pattern for the desired address sequence 3, 4, 5, 2, 7, 6, 1, 2. This is sequence is first decomposed into a three-digit binary number comprised of the components $2^2+2^1+2^0$:

$2^2$=>0, 1, 1, 0, 1, 1, 0, 0

$2^1$=>1, 0, 0, 1, 1, 0, 0, 1

$2^0$=>1, 0, 1, 0, 1, 0, 1, 0

Next, the binary number is checked to see whether the sequence satisfies rules 1 and 2. The $2^1$ sequence does repeat every four bits, and the $2^0$ sequence does alternate every digit. Consequently, the bit sequence layout may commence. For the $2^2$ sequence, the first bit in the sequence (0) is placed at the tap location (bit 10) and the succeeding bits in the sequence are laid out as described above. The resulting bit sequence is as follows:

| 13 | 12 | 11 | 10 | 9 | 8 | 7 | 6 |
|---|---|---|---|---|---|---|---|
| 1 | 0 | 1 | 1 | 0 | 0 | 0 | 1 |

Next, the four bits of the $2^1$ sequence are laid out across bits 2–5 of the anchor pattern beginning at tap bit 4 and proceeding in the opposite direction of the transform. The result is as follows:

| 13 | 12 | 11 | 10 | 9 | 8 | 7 | 6 | 5 | 4 | 3 | 2 |
|---|---|---|---|---|---|---|---|---|---|---|---|
| 1 | 0 | 1 | 1 | 0 | 0 | 0 | 1 | 0 | 0 | 1 | 1 |

Lastly, the first two bits of the $2^0$ sequence is laid out across bits O and 1 of the anchor pattern starting at the tap bit 1. The completed anchor pattern and the patterns resulting from the successive transformations of the anchor pattern are shown in FIG. 4. By checking the values for each row in tap position 1, 4 and 10, it can be seen that the desired address sequence has been obtained.

As noted above, with the 14-bit anchor pattern implemented in the arrangement of FIG. 1, there are some sequences which cannot be chosen due to the constraints imposed by the choice of fields $2^0$ and $2^1$ of diminished size from field $2^2$. Where additional potential sequences are necessary or desirable, the size of field $2^0$ or field $2^1$ or both fields can be increased. For example, field 0 can be increased to a three-bit field, field $2^1$ can be increased to a seven-bit field or the like. In order to provide all possible sequences, the anchor pattern should be expanded to three fields of eight bits each. However, where not all possible sequences are required, it is convenient to reduce the number of bus conductors or to reduce the number of the required tap connections and the size of the address bus 25.

The following illustrates how a desired address sequence which cannot be converted to a proper anchor pattern using the 14-bit implementation may be converted into a usable anchor pattern in a 24-bit anchor implementation.

The desired address sequence of 1, 3, 5, 7, 0, 2, 4, 6 is decomposed into a three-digit binary number comprised of the components $2^2+2^1+2^0$.

$2^2$=>0, 0, 1, 1, 0, 0, 1, 1

$2^1$=>0, 1, 0, 1, 0, 1, 0, 1

$2^0$=>1, 1, 1, 1, 0, 0, 0, 0

Checking the binary numbers against the rules, rule 1 is satisfied since the $2^1$ sequence does repeat every four bits. However, the $2^0$ sequence does not alternate every digit and the sequence cannot be constructed using a 14-bit pattern.

Taking the same sequence, and selecting a 24-bit anchor pattern, the anchor pattern layout proceeds as follows. No rule checks are necessary with a 24-bit pattern, since all patterns can be implemented. Consequently, the bit sequence for the $2^2$ sequence is first laid out in a similar fashion to that described above starting at the tap bit (position 19 in this case) and proceeding in the opposite direction of the transform (i.e., right to left), wrapping from 23 to 16, and finishing at bit 18. The resulting bit sequence is as follows:

| 23 | 22 | 21 | 20 | 19 | 18 | 17 | 16 |
|---|---|---|---|---|---|---|---|
| 0 | 1 | 1 | 0 | 0 | 1 | 1 | 0 |

Next, the bit sequence for the $2^1$ sequence is laid out across bits 15–9 of the anchor pattern starting at the tap bit (position 9). The result is as follows:

| 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|
| 0 | 1 | 1 | 0 | 0 | 1 | 1 | 0 | 0 | 1 | 0 | 1 | 0 | 1 | 0 | 1 |

Lastly, the bit sequence of the $2^0$ field is laid out across bits 7–0 of the anchor pattern starting at the tap bit (position 4). The complete anchor pattern, and the remaining transformations are shown in FIG. 5. The sequence can be checked row by row and compared to the desired sequence.

As will now be apparent, the invention affords a highly flexible addressing arrangement for an array of devices which is particularly suited for highly configurable computer systems. Further, the invention can be implemented in a relatively straightforward and simple fashion using essentially only passive devices (the tap connections and the transform elements 28), which can be prefabricated and tested prior to installation. Once connected, the desired address sequence is selected, is converted to a suitable anchor pattern, and the desired addressing sequence is automatically provided to the individual devices connected to the information bus.

Implementation of the transform elements 28 can be accomplished in a number of ways. Firstly, the address bus can be incorporated into suitable cables, such as flat flexible cables, and the conductive patterns required to shift and rotate the individual conductor lines can be formed within the cable itself. Alternatively, the transform elements may be individual bridge connector elements incorporating the shift and rotate wire patterns and provision may be made to insert such discreet devices into the address bus path. Still further, individual segments of information bus 10 may be implemented as fixed length multiple conductor paths on substrates in close proximity to the bus devices 14–21 and, in such applications, the transform elements 28 can be incorporated into portions of such substrates along with appropriate connectors to route the address bus conductors to the input portion of the transform elements 28 and to route the output conductors from the transform elements 28 back to the address bus 25.

While the above provides a full and complete disclosure of the preferred embodiments of the inventions, various modifications, alternate constructions and equivalents may be employed, as desired. For example, anchor patterns with different numbers of bits per field, as well as different numbers of fields, may be selected and employed, depending on the address requirements of a particular application. Therefore, the above description and illustrations should not be construed as limiting the scope of the invention which is defined by the appended claims.

What is claimed is:

1. A method of specifying the physical address of a plurality of devices each requiring a unique address in an array, said method comprising the steps of:

(a) selecting [the individual] *a* desired address sequence;

(b) creating an anchor pattern representing an initial device address, said pattern having a plurality of multi-bit rank ordered fields each having a superior end position and an inferior end position;

(c) creating a bit pattern representing the next address in the sequence by shifting the bit pattern in each field in the direction of the superior end position of that field by an integral multiple of one rank [and relocating the superior end rank position bit of the pattern to the inferior end rank position; and (d) continuing step (c) until the last address in the sequence is attained] *wherein each bit that is shifted beyond the superior end position is rotated back to the inferior bit position.*

2. The method of claim 1 wherein the integral multiple in step (c) is unity.

3. The method of claim [1] *22* wherein [said step (d)] *the said step of creating a bit pattern* is performed a number of times equal to J−2, where J is the total number of *a plurality of* devices.

4. The method of claim [1] *22* wherein said anchor pattern comprises N bits and the number of said field is i, where i is the minimum number of bits required to uniquely specify J devices.

5. The method of claim 4 wherein N≧i.

6. The method of claim 4 wherein N=i.

7. The method of claim 4 further including the step of specifying each address with a bit of predetermined rank from each of the i fields.

8. A multiconductor bus device for specifying a unique physical address for each of a plurality J of devices in an array in accordance with a desired address sequence, said bus device comprising:

N conductors arranged in parallel and grouped into i fields, [where i is the minimum number of bits required to uniquely specify J devices,] each field having a plurality of rank ordered bits with a superior end position and an inferior end position, the physical address for each device being determined by i bit values selected from one conductor of each field; and a plurality of transform elements each having an input and an output coupled to said N conductors for converting a physical device address presented at the input thereto to the next physical device address in the desired address sequence at the output thereof, each transform element including means for shifting the bit pattern in each field of a physical device address presented at the input by an integral multiple of one rank [and means for relocating the superior end rank position bit of the input address to the inferior rank position of the next physical device address].

9. The invention of claim 8 wherein said integral multiple is unity.

10. The invention of claim 8 wherein N≧i.

11. The invention of claim 8 wherein N=i.

12. The invention of claim 8 wherein each transform element comprises a plurality of N input terminals, a plurality of N output terminals and a plurality of N conductive paths coupled between said input terminals and said output terminals, one path coupling the input terminal corresponding to the superior end rank position of each field to the output terminal located at the inferior rank position of the corresponding field, the remaining paths effecting the bit pattern shift.

13. A method of producing an anchor pattern capable of being transformed into a desired sequence of physical device addresses each comprising a plurality of bits each selected from a different one of a plurality of rank ordered multi-bit fields, said method comprising the steps of:

(a) selecting a desired address sequence;

(b) converting each address of the desired sequence to a multi-field binary equivalent having a number of fields equal to the number of bits comprising each address, *each field having a number of bits relatively prime to the number of bits in the preceding field*; and (c) arranging the bits in each binary equivalent field in a sequential order related to the manner in which the anchor pattern is transformed into the desired sequence of physical device addresses.

14. The method of claim 13 wherein said anchor pattern comprises N bits and the number of said fields is i, where i is the minimum number of bits required to uniquely specify J devices.

15. The method of claim 14 wherein N≧i.

16. The method of claim 14 wherein N=i.

17. The method of claim 14 further including the step of specifying each address with a bit of predetermined rank from each of the i fields.

*18. A transform element comprising:*

*(a) a plurality of rank order inputs grouped into fields; and*

*(b) a plurality of rank ordered outputs grouped into the fields, each field having a superior end position and an inferior end position, wherein each rank ordered input within a field is operatively coupled to a rank ordered output shifted in that same field by an integral multiple of one rank such that each bit of the output that is shifted beyond the superior end position of each field is rotated back to the inferior bit position.*

*19. The transform element of claim 18, wherein an input is tapped for connecting a device.*

*20. The transform element of claim 18, wherein the integral multiple is unity.*

*21. The transform element of claim 20, wherein an input is tapped for connecting a device.*

*22. The method of claim 2, wherein the step of creating further includes relocating the superior end rank position bit of the pattern to the inferior end rank position.*

*23. The method of claim 22, wherein the step of creating is repeated to create additional addresses in the sequence.*

*24. The method of claim 8, wherein I is the minimum number of bits required to uniquely specify J devices.*

* * * * *

UNITED STATES PATENT AND TRADEMARK OFFICE

CERTIFICATE OF CORRECTION

PATENT NO. : RE 37,613 E
DATED : March 26, 2002
INVENTOR(S) : Thomas Warren Savage It is certified that error appears in the above-identified patent and that said Letters Patent is hereby corrected as shown below:

Title page,
Assignee information, replace "Compaq Cupertino Corporation" with -- Compaq Computer Corporation --.
ABSTRACT,
In the first line replace "flexibility" with -- flexibly --.

Signed and Sealed this

Twenty-eighth Day of May, 2002

*Attest:*

*Attesting Officer*

JAMES E. ROGAN
*Director of the United States Patent and Trademark Office*